United States Patent [19]

Syracuse

[11] Patent Number: 4,750,059

[45] Date of Patent: Jun. 7, 1988

[54] DATA RECORDING FORMAT FOR AN INFORMATION-BEARING DISK

[75] Inventor: Anthony A. Syracuse, Fairport, N.Y.

[73] Assignee: Eastman Kodak Company, Rochester, N.Y.

[21] Appl. No.: 900,197

[22] Filed: Aug. 25, 1986

[51] Int. Cl.$^4$ .......................... G11B 5/09; G11B 5/76
[52] U.S. Cl. ........................................ 360/48; 369/59
[58] Field of Search ....................... 360/48, 65; 369/59

[56] References Cited

U.S. PATENT DOCUMENTS 3,351,920 11/1967 Harper .................................. 340/173
4,422,110 12/1983 Reynolds ............................... 360/48
4,514,771 4/1985 Stark et al. ............................. 360/73

OTHER PUBLICATIONS

"Disc File Memories", by H. McLaughlin, Instruments & Control Systems, vol. 34, 11/61 pp. 2063-2068.

*Primary Examiner*—Vincent P. Canney
*Attorney, Agent, or Firm*—Dennis P. Monteith

[57] ABSTRACT

An information-bearing disk (magnetic-rigid or floppy, magneto-optical - Kerr or Faraday, optical or an equivalent thereof) includes equally spaced data-storing tracks grouped in a plurality of annular zones encircling the center of the disk. The ratio of the radius of the innermost track of any given zone to the radius of the innermost track of the adjacent inner zone is a constant, k, calculated from:

$$k = \sqrt[N]{\frac{R_0}{R_i}}$$

where
$R_o$ is the outer radius of the outermost zone of the disk,
$R_i$ is the inner radius of the innermost zone of the disk, and
N is the number of disk zones.

2 Claims, 4 Drawing Sheets

NORMALIZED READ DATA RATES
FOR A CONSTANT DISK ANGULAR VELOCITY

| ZONE | WRITE ANGULAR VELOCITY | READ ANGULAR VELOCITY | | | | |
|---|---|---|---|---|---|---|
| | | a | b | c | d | e |
| 1 | a | a/a | b/a | c/a | d/a | e/a |
| 2 | b | a/b | b/b | c/b | d/b | e/b |
| 3 | c | a/c | b/c | c/c | d/c | e/c |
| 4 | d | a/d | b/d | c/d | d/d | e/d |
| 5 | e | a/e | b/e | c/e | d/e | e/e |

FIG. 1
(PRIOR ART)

NORMALIZED READ DATA RATES
FOR A CONSTANT DISK ANGULAR VELOCITY

| ZONE | WRITE ANGULAR VELOCITY | READ ANGULAR VELOCITY | | | | |
|---|---|---|---|---|---|---|
| | | a | b | c | d | e |
| 1 | a | 1 | $1/k$ | $1/k^2$ | $1/k^3$ | $1/k^4$ |
| 2 | b | $k$ | 1 | $1/k$ | $1/k^2$ | $1/k^3$ |
| 3 | c | $k^2$ | $k$ | 1 | $1/k$ | $1/k^2$ |
| 4 | d | $k^3$ | $k^2$ | $k$ | 1 | $1/k$ |
| 5 | e | $k^4$ | $k^3$ | $k^2$ | $k$ | 1 |

FIG. 3

DATA RECORDING FORMAT FOR AN INFORMATION-BEARING DISK

BACKGROUND OF THE INVENTION

1. Field of the Invention

The present invention relates generally to an information-bearing disk. More particularly, the invention relates to the arrangement of data recorded on the disk. The disk may be magnetic (rigid or flexible), magneto-optical (Kerr or Faraday), optical, or an equivalent thereof.

2. Description Relative to the Prior Art

An information-bearing disk includes a plurality of relatively narrow, data-storing tracks encircling the center of the disk. Commonly, the tracks are either circular or in an equivalent spiral form, and are equally spaced from each other by a guardband.

Data is commonly written on the disk at a uniform rate. Thus, when the disk rotates at a constant angular velocity (CAV), the same number of bits occur in each track. Because the length of each track depends on its radius, data density decreases with increasing radius, and only the innermost track may have the maximum allowable bit density. This is very inefficient in terms of data storage capacity.

To avoid the aforementioned inefficiency of the CAV technique, a maximum allowable bit density may occur in each track when the disk is rotated on the basis of a constant linear velocity (CLV) technique. With data written at a constant rate, the angular velocity of the disk must vary in inverse proportion to track radius. For a series of circular tracks, the angular velocity changes in a stepwise manner with each new track. For a spiral track, the angular velocity changes continuously with angular position. Although the CLV technique may maximize storage capacity, it adds significantly to the complexity and cost of a drive mechanism for the disk.

An alternative approach, also known in the prior art, combines features of the CAV and CLV techniques. To that end, the recording surface of a disk is divided into a number of non-overlapping, annular zones of equal width. A track within a given zone has the same number of bits as other tracks in the same zone. For maximum storage capacity for a disk having data arranged in this manner, the innermost track of each zone has the maximum bit density allowed by the system.

While tracing tracks within a zone, data density decreases with increasing radius (as with the CAV system). When the first track of an adjacent zone is reached, there is a step change in rotational velocity (similar to the CLV system), to maintain the required data density during a write operation and a uniform data rate during a read operation. U.S. Pat. No. 4,530,018 discloses a drive mechanism for a disk having equal-width zones.

When operating at a constant data rate, it is required that the linear velocity of the innermost track of each zone be the same. Thus, to retrieve data from any zone at a fixed rate requires that the drive mechanism servo to the appropriate angular speed during a zone accessing interval. It will be appreciated that a high-performance channel decoder for use with disk drive apparatus has a narrow range of operation, for example one percent of a desired data rate; thus readout cannot reliably take place until drive mechanism transients have decayed sufficiently. This places stringent demands on the zone access mechanism and drive motor torque/power requirements.

An alternative arrangement, which consumes significantly less power, is to hold disk angular velocity constant during a read operation and let the data rate vary as data is read from one zone to the next. With reference to the use of a prior art "zoned" disk in this manner, reference is made to FIG. 1, of the accompanying drawings, which is a matrix showing the permutations in read data rate (normalized) for a 5-zone disk, as a joint function of the angular velocity of the disk during a write operation and the angular velocity of the disk during a read operation when the disk is rotated at any one of the speeds used during writing.

With the above-mentioned 5-zone disk, data written at a uniform rate requires that each of zones one through five have angular velocities of a, b, c, d and e, respectively. Assuming that zone 1 is the inner zone and zone 5 is the outer zone, the angular velocity "a", for inner zone 1, would, of course, be the fastest, and velocity "e", for outer zone 5, would be the slowest.

Vertical movement in the matrix of FIG. 1 represents accessing a zone without a corresponding change in disk velocity; horizontal movement represents a change in disk velocity without a change in zone. Thus, each column of the matrix of FIG. 1 shows actual read data rate when only one of these five velocities is employed as a particular read angular velocity.

Note that each of the five main diagonal terms of FIG. 1 has a normalized read data rate of unity. Referring to the two diagonals immediately adjacent the "unitary" diagonal, one might expect that a matrix entry from either diagonal would be approximately equal to the other entries in the same diagonal. In other words, one might expect the term b/a to be close to c/b, and that c/b would approximate d/c, etc., and, in the other diagonal, a/b to equal b/c, etc. Similar logic may be applied to the other diagonals.

With a disk having equal-width zones, however, the terms in a given diagonal, other than the main diagonal, are different from each other.

The matrix of FIG. 1 shows, for a 5-zone disk, that there are 21 different read data rates when any one of the write angular velocities is used throughout a read operation. For the general case of a disk having N equal-width zones, the total number of read data rates equals $N^2 - (N-1)$. The identical terms in the main diagonal explain the existence of the $(N-1)$ term in the general expression for number of read data rates.

It is not possible for a single high performance decoder channel to accommodate the variations in read data rates when angular velocity is constant. Multiple decoder channels must handle the different data rates when only one angular velocity is employed in a given read operation. This, of course, contributes significantly to the cost and complexity of signal processing circuitry for a disk having equal-width zones.

SUMMARY OF THE INVENTION

The invention relates to a disk having data-storing tracks grouped into a plurality of annular zones encircling the center of the disk wherein the innermost track of each zone has the same bit density and wherein each track in a given zone has the same number of information-bearing bits as other tracks in the same zone. An object of the invention is to overcome the aforementioned disadvantages of a disk of this general type and, in so doing, reduce the number of data rates when the angular velocity of the disk is held constant during a read operation. This object is achieved by selecting the radius of the innermost track of each zone (these tracks have the same bit density) so that, upon accessing forward (or backward) each successive zone when disk angular velocity is held constant, the same percentage change in read data rate is caused to occur when stepping from one zone to the next. The terms "same percentage change" or "same ratio" or their equivalent, as used herein, shall mean and include "substantially the same percentage change" or "substantially the same ratio", to allow for minor variations in a desired data rate that a high performance channel decoder may tolerate.

With the same percentage change in data rate occurring from zone to zone, all terms in a given diagonal of the matrix of FIG. 1, parallel to the unitary diagonal, are forced to be equal to each other; thus, for a disk having N zones, the number of unique read data rates is reduced from the aforementioned $N^2-(N-1)$ to $2N-1$.

Knowing the relationship that is desired for the relative angular velocities from zone to zone, it then follows that a ratio, k, of the radius of the innermost track of any given zone to the radius of the innermost track of the adjacent inner zone is a constant which is the same for each corresponding pair of adjacent zones.

For a disk having N zones, the aforementioned ratio "k" is calculated from:

$$k = \sqrt[N]{\frac{R_0}{R_i}}$$

where $R_o$ is the outer radius of the outermost zone, and
$R_i$ is the inner radius of the innermost zone. ($R_o-R_i$ defines, of course, the width of the total recording surface of the disk.) Thus, the zones are of varying size, with the width of each zone progressively increasing from one zone to the next outer zone.

As with the prior art, the innermost track of each zone may have the maximum data density for peak storage capacity. Within a zone, this data density decreases with increasing radius until the next zone is reached. At this point, a step change in angular velocity—equal to the inverse of the ratio k—provides the maximum data density for the innermost track of the next outlying zone during a write operation, and a uniform data rate during a read operation, if desired.

With a disk having multiple zones of varying width in accordance with the invention, when the read angular velocity is constant, accessing an adjacent zone forwardly (or backwardly) causes a percentage change in read data rate which is the same when accessing any adjacent zone in a given direction. In other words, the terms in any given diagonal in the aforementioned matrix of FIG. 1 are now the same, i.e. b/a is equal to c/b which equals d/c, etc. It also follows that within any other diagonal that is parallel to the "unitary" diagonal, each matrix term is equal to the other terms in the same diagonal. Thus, the number of unique data read rates is reduced to $2N-1$, which correspondingly reduces the complexity of the signal processing electronics for the disk when its angular velocity is held constant during a read operation.

A further advantage of the invention is that during a write operation, the linear velocity of the outermost track is the same from one zone to the next outer zone when the step change in angular velocity, equal to the reciprocal of "k", occurs from zone to zone. Thus, the range of linear track velocities is also the same from zone to zone. This "quasi-constant linear velocity" (QCLV) effect simplifies data write operations, and therefore provides more uniform data quality.

These and other advantages of the invention will become more apparent in the detailed description of a preferred embodiment presented below.

DESCRIPTION OF THE DRAWINGS

In the detailed description of a preferred embodiment of the invention presented below, reference is made to the accompanying drawings, in which:

FIG. 1 is a matrix illustrating permutations in data rate (normalized) as a joint function of the angular velocity of an information-bearing disk, known in the art, during a write operation and the angular velocity of the disk during a read operation when the disk is rotated at any one of the speeds used during writing;

FIG. 3 is a matrix, similar to the matrix of FIG. 1, illustrating the permutations in read data rate (normalized) when data-storing tracks are grouped into zones arranged in accordance with the teachings of the invention;

DETAILED DESCRIPTION OF A PREFERRED EMBODIMENT

Figure 2:
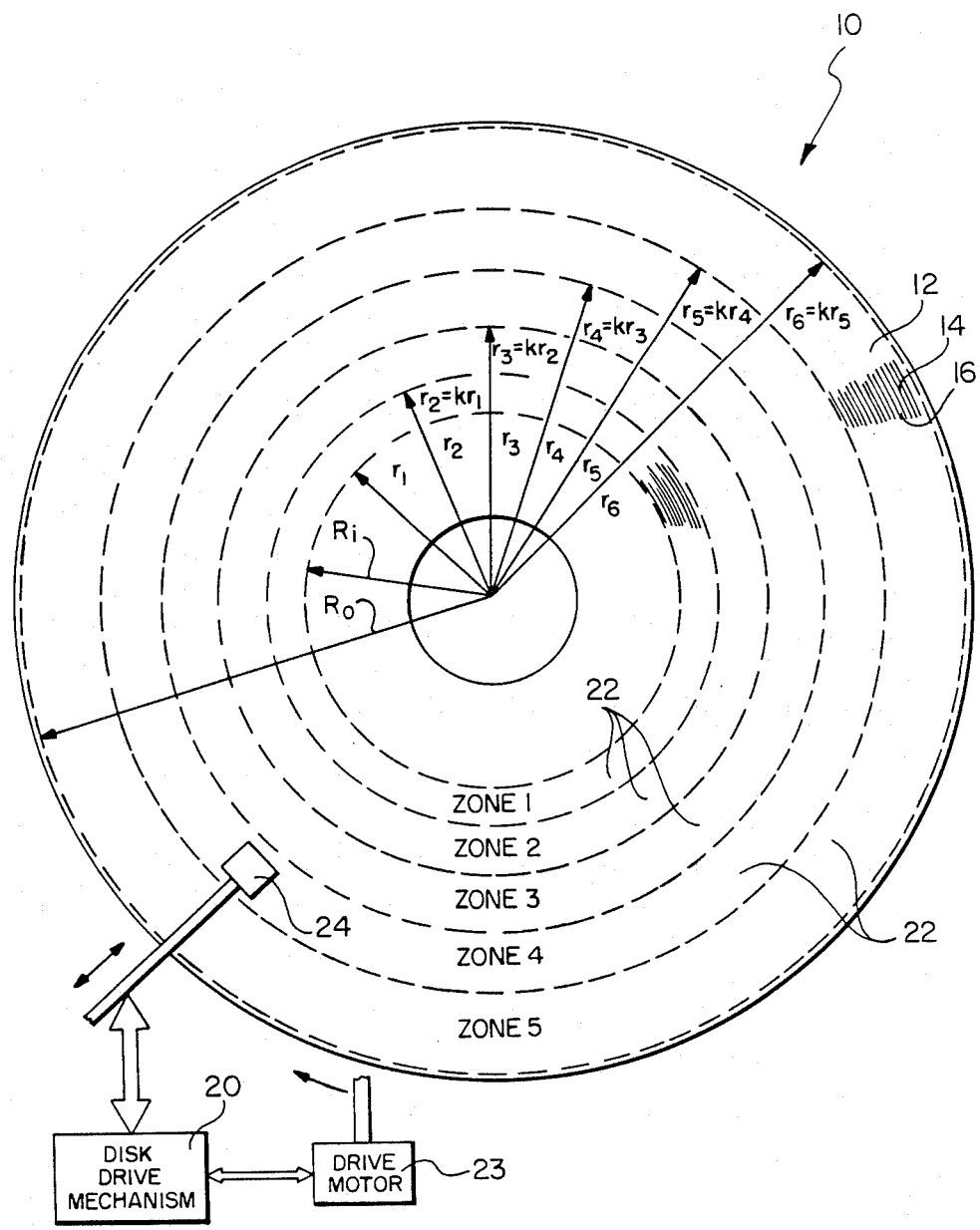
FIG. 2 is a schematic top view of an information-bearing disk illustrating the grouping of data-storing tracks into annular, variable-width zones, in accordance with the invention.

FIG. 2 illustrates an information-bearing disk 10 having a recording surface 12. Preferably, the recording surface 12 is optical, although various alternative surfaces, such as magnetic and magneto-optical, may also be used. It should be recognized that both signals and double-sided recording may be employed, and that when double-sided recording is used, as is preferred, both circular sides of the disk 10 include a recording surface 12.

The surface 12 includes a plurality of equally spaced data-storing tracks 14 separated by a relatively narrow guardband 16 to reduce crosstalk between the tracks. The tracks are concentric with the center of the disk 10 and, as such, may be either circular or in a spiral form.

In accordance with a widespread standard, each track is divided into a plurality of sectors (not shown). The sectors serve to divide information on each track into corresponding blocks comprising a predetermined number of bits. The bits within a sector are arranged into two groups. The first group of bits is commonly known as a sector header and the second group, which follows the sector header, is commonly known as a data field.

The bits in a sector header include record-keeping data such as variable frequency oscillator (VFO) synchronization bits, a sector address, etc. A VFO synchronization bit pattern, for example, allows a VFO of a decoder channel to synchronize to an incoming bit stream. Sector addresses, on the other hand, are conveniently numbered sequentially beginning with the outermost track 14 on the disk 10.

A data field primarily includes user data bits, error detection and correction bits, as well as servo information for tracking control.

Information on the disk 10 is organized so as to efficiently store data, without unduly complicating a drive mechanism 20 for the disk. To those ends, the tracks 14 are grouped into a plurality of non-overlapping, annular zones 22.

A track 14 within a given zone 22 contains the same number of bits as other tracks within the same zone. Because the length of each track is linearly proportional to its radius, data density decreases with increasing radius for the tracks within the same zone.

For the purpose of efficiently storing data, the innermost track of each zone 22 has a maximum bit density, permitted by the system, to maximize the storage capacity from zone to zone. Thus, a track from an outlying zone 22 has a greater number of bits than any given track in a more inner zone.

To transfer data (write or read) at a uniform rate, the drive mechanism 20 causes a spindle drive motor 23 to rotate the disk 10 at a constant rotational velocity, while a read/write transducer head 24, also under the control of the drive mechanism, traces tracks radially within a given zone 22. When the head 24 crosses a boundary separating one zone 22 from another zone, however, either toward a more outer zone or toward a more inner zone, the drive mechanism 20 must take a corresponding step change in rotational velocity, to sustain the uniform data rate. Thus, the drive mechanism 20 is relatively simple in that the spindle drive motor 23 for the disk 10 is limited to providing a discrete number of rotational velocities corresponding to the number of zones on the disk 10, while relatively efficient data storage capacity is maintained throughout the disk.

Implicit with the operation of a "zoned" disk to provide a uniform data rate, however, is the requirement that its angular speed be adjusted rapidly as tracks are traced from one zone to the next because no data can be accurately read until a decoder channel is synchronized to the incoming bit stream. With currently available drive motors, a few hundred watts of power are needed, for medium to large disks, to change spindle speed within a brief interval—on the order of one second or less—required of a modern disk drive mechanism. To overcome this problem, an alternative mode of operation is to maintain the angular velocity of the disk constant and thereby let the read data rate vary as data is read from one zone to the next. As described in detail hereinbefore, however, prior art "zoned" disks having N equal-width zones suffer from a disadvantage in this mode of operation because of the large number of data rate permutations—$N^2 - (N-1)$—as tracks are traced starting from any one zone and moving to any other zone. Accordingly, an object of the invention requires that the number of data rate permutations be reduced when disk angular velocity is constant during a read operation.

To achieve such object of the invention, each zone 22 of the disk 10 is so arranged that accessing an adjacent zone, in a given direction, causes the read data rate to change by a fixed percent whenever the disk angular velocity is constant. As described hereinbefore, this reduces the number of data rate permutations to $2N-1$, for a disk having N zones, and thereby significantly simplifies decoder channel circuitry.

It was previously shown, by way of the example of FIG. 1, the manner in which read data rate varies, with disk angular velocity held constant, as data are read from one zone to the next zone. In particular, the data rate varies from a normalized value of "1" for innermost zone 1 to "a/b" when accessing zone 2; data rate changes from a normalized unity value to "b/c" when accessing zone 3 after initially accessing zone 2; the change is to "c/d" when moving to zone 4 from zone 3; etc.; where "a", "b", "c", "d", etc. correspond respectively to the angular velocities of the disk for inner zone 1, zone 2, zone 3, zone 4, etc. when data are written (or read) at a uniform rate. It therefore follows, in accordance with achieving the object of the invention, that the same percentage change in read data rate occurs, while progressively accessing one zone to the next outer zone, when:

$$a/b = b/c = c/d = d/e, \quad (1)$$

etc.

Knowing the relationship that is desired for the relative angular velocities for each zone, it follows that the conditions of equation (1) above are met for a disk having N annular zones 22 when a ratio, k, between the angular velocity of any given zone to the angular velocity of the adjacent outer zone is a constant given by:

$$k = \sqrt[N]{\frac{R_o}{R_i}} \quad (2)$$

where $R_o$ is the outer radius of the outermost zone, and
$R_i$ is the inner radius of the innermost zone, as shown in FIG. 2.

A more thorough understanding of the basis of the ratio "k" follows from:

$$B_i = 2\pi p r_i, \quad (3)$$

where $B_i$ is the number of bits per track 14 in the "ith" zone 22, p is the bit density of the innermost track of any given zone (p is the same for the innermost track of each zone), and $r_i$ is the radius of the innermost track of the "ith" zone.

For a uniform data rate, $$v_i B_i = v_{i+n} B_{i+n}, \quad (4)$$

where $v_i$ is the angular velocity of the "ith" zone, and
$i+n$ is any positive integer from one to N.

That is, angular velocity (v) is "a" for zone 1, "b" for zone 2, etc.

Substituting equation (3) into equation (4), it follows that, $$v_i 2\pi p r_i = v_{i+n} 2\pi p r_{i+n}$$

or $$\frac{v_i}{v_{i+n}} = \frac{r_{i+n}}{r_i} \qquad (5)$$

It was shown previously, by means of equation (1), that the ratio of the angular velocities corresponding to adjacent zones must be a constant (k) for the read data rate to change by a fixed percentage when disk angular velocity is constant. From that requirement, it therefore follows, from the generalized expression of equation (5), that $$\frac{r_1}{r_2} = \frac{r_2}{r_3} = \frac{r_3}{r_4} \cdots \frac{r_N}{r_{N+1}} = \frac{1}{k} \qquad (6)$$

where $r_{N+1}$ corresponds to the inner radius of an imaginery outer zone—a zone number six for a disk having five actual zones (N=5), as shown in FIG. 2.

From the above expression for $r_1$, in terms of k, and making successive substitutions with the expressions for the other r's, it follows for a disk having N zones, that $$k = \sqrt[N]{\frac{r_{N+1}}{r_1}} \qquad (7)$$

In other words, $$k = \sqrt[N]{\frac{R_o}{R_i}}$$

where $R_o$ and $R_i$ are as previously defined.

The expression for "k" provides the ratio of the angular velocity of one zone to the adjacent outlying zone, when data are to be transferred (written or read) at a uniform rate. It is also the expression for the ratio of the radius of the innermost track of any one zone to the radius of the innermost track of the adjacent inner zone. Thus, the zones are no longer of equal width, as taught by the prior art, but are now of progressively increasing width from the inner zone 1 to the outermost zone, zone number 5, in a preferred embodiment of FIG. 2.

The data storage capacity of each zone varies, of course, from one zone to the next. By varying the width of each zone (the difference between the radius of the outer track of a given zone and the radius of the inner track of that same zone) there is a sizable difference in storage capacity between the most outer zone and the inner zone. (This is also true with a disk having equal zones, but not to the degree provided by the disk data format constituting the present invention.) By having relatively greater amounts of data in the more outer zones, zone switching diminishes for a limited read operation that begins in any one of the more outer zones.

The matrix of FIG. 3 shows the variations in read data rate permutations (normalized) when the width of each of the zones 22 varies by the aforementioned factor "k", in accordance with the teachings of the invention. Note in particular how the normalized data rates form individual diagonals of constant value through the matrix, and the functional relationship in terms of "k", between individual diagonals. FIG. 3 further shows that the number of unique read data rates for a disk having N zones, in accordance with the invention, is reduced to the aforementioned 2N−1, from the aforementioned $N^2-(N-1)$, for prior art zoned disks. Thus, for a disk having five zones, for example, the number of unique data rates is reduced to nine from twenty one.

FIG. 3 illustrates a further feature of the invention in that the number of read data rates may be reduced advantageously from 2N−1, by permitting a limited number of changes in disk angular velocities during a read operation. Again by way of example with a 5-zone disk, assume that the diagonals corresponding to $k^2$, 1, and $1/k^2$ are acceptable read data rates. At most, only a double incremental change in read angular velocity (horizontal movement in the matrix) is necessary to reach one of these three data rates regardless of where one is in the matrix representative of a 5-zone disk. With a single or double change in speed, an extraordinary amount of spindle drive torque would not be required for a fast zone access time. With the three data read rates chosen, a single spindle speed change (from writing to reading or reading to reading) is all that is necessary in twelve out of the total of twenty-five access combinations, while a double spindle speed change is needed from only two of the zone-speed combinations. Other groups of three read rates could be selected, but would require a larger dynamic range of read data rates for the 5-zone example shown.

A further feature of the invention is that when a step change "k" (or 1/k—depending on the zone accessing direction) in angular velocity occurs from zone to zone, for example when writing data at a uniform rate, the linear velocity of the outermost track is the same from one zone to the next. Thus, the total range of linear track velocities is now a constant from zone to zone.

The amplitude of the recorded signal is a function of linear track speed. Thus, this "quasi-constant linear velocity" (QCLV) effect simplifies a data write operation, as the data write circuitry now may operate over a range of power levels that is a constant from zone to zone, to maintain a relatively constant signal-to-noise and linearity for the recorded data.

Up to now, the recording format of the disk 10 has been characterized by the relationship between "k" and the radii of the innermost tracks of respectively adjacent zones. Each encoded data bit is accommodated in an interval, commonly known as a bit cell. Each bit cell may be a time interval, when data are transmitted via an information channel, or a space interval, when data are recorded on a storage medium.

Regarding the disk 10, a bit cell is the same size (length) on each innermost track, since each of those tracks has the same bit density. With the linear velocity of the outermost track being the same from one zone to the next, data, written at a uniform rate, requires that the length of a bit cell of an outermost track is also the same from one zone to the next. Because data density in a given zone decreases with radius, a bit cell on an outer track is, of course, greater in length than a bit cell on an inner track. Nevertheless, a disk 10, in accordance with the invention, may further be characterized in that a ratio defined by a bit cell of an outermost track of a given zone to a bit cell of an innermost track of the same zone or any other zone, is a constant.

Within a given spiral track, bit cell length varies slightly as a function of angular position. Thus, the ratio of a bit cell of an outermost spiral track to the bit cell of an innermost spiral track is a constant for corresponding bit cells, i.e. cells having substantially the same angular position.

Figure 4:
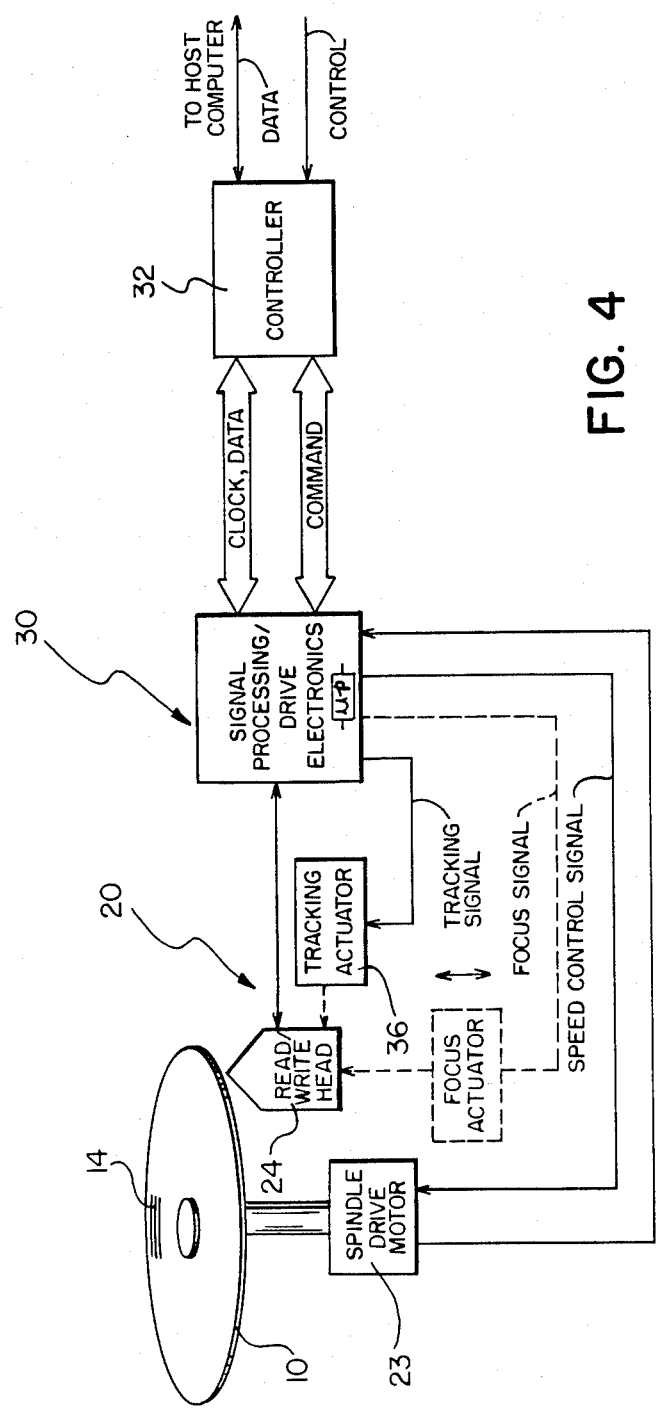
FIG. 4 is a schematic of a disk drive for the information-bearing disk of FIG. 2.

FIG. 4 shows generally the disk drive mechanism 20, including microprocessor-based signal processing/drive electronics 30, for use with the information-bearing disk 10 according to the present invention. A conventional disk drive controller 32 forms an interface between the electronics 30 and a host computer (not shown). In that capacity, the controller 32 receives data to be recorded and control information from the host computer, and supplies that data, including track seek information, to the electronics 30. The applied data is encoded using, for example, a conventional encoding format of the type employed for disk recording, such as delay modulation mark (DMM).

The signal processing/drive electronics 30 performs a variety of functions related to the control of the drive mechanism 20, including initialization, track seeking, emulation of other disk drive products, and self diagnostics. In its initialization function, the electronics 30 operates, when power is first applied, to be sure that the drive motor 23 is rotating the disk 10 at the proper initial velocity. At other times, the electronics 30 functions to cause the motor 23 to rotate the disk 10 at a desired speed for a track 14 at which a writing or read operation is to occur.

In its interface with the controller 32, the electronics 30 accepts non-return-to-zero (NRZ) data and clock timing signals and encodes the data in a format such as DMM for recording by the transducer head 24 on the disk 10.

In the reverse direction of data flow, the head 24 feeds DMM playback data to the electronics 30, which converts the received data to NRZ format. Furthermore, during a read operation, the drive electronics 30, in response to playback data, derives control signals including a clock signal, which is synchronized with the data stream read from the disk 10, a speed control signal to provide accurate speed control of the drive motor 23, and a tracking control signal, supplied to a tracking actuator 34, for a track seeking operation and for maintaining the transducer head 24 in alignment with a track 16 being traced. When the disk 10 is magneto-optical or optical, the electronics 30 also functions to provide a focus control signal to a focus actuator 36, which provides precise focusing of a laser beam of light produced by the head 24.

Figure 5:
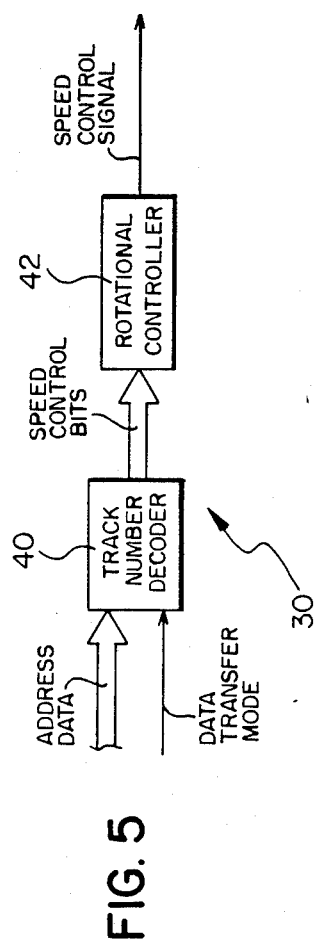
FIG. 5 is a block diagram showing electronics of the disk drive mechanism for causing the disk to rotate at a desired speed.

For the purpose of causing the disk 10 to rotate at a desired speed, the drive electronics 30, as shown in FIG. 5, includes a track number decoder 40, which serves to determine which one of the zones 22 on the disk data is to be written on or read from. A rotational controller 42, which receives the output of the decoder 40, produces the aforementioned speed control signal which controls the drive motor 23.

As described previously herein, sector addresses are numbered sequentially beginning with the outermost track 14 of outer zone 5 to the innermost track of inner zone 1. There will be, of course, more addresses for a given track in an outer zone, than for a particular track in a more inner zone. Likewise, there are more tracks in an outer zone than in an inner zone. The track number decoder 40, in response to data representing a given address, serves to determine on which track, and thereby which zone, this address is located. Conveniently, this can be done by means of a look-up table associated with the microprocessor of the electronics 30.

A data transfer mode signal, together with the address data, causes the track number decoder 40 to produce an output in the form of speed control bits representative of a desired speed for the disk drive motor 23. When data are to be transferred at a uniform rate (either recording or playback), the decoder produces a pattern of speed control bits corresponding to the zone 22 containing the track address at which data transfer occurs. When data are to be played back at a variable rate, on the other hand, preferably the decoder 40 selects a speed-control-bit pattern which minimizes a zone accessing operation. Thus, if the disk 10 is already rotating at a given speed due to a recording operation in a given zone, the decoder 40, under logic provided by the electronics 30, may operate to maintain the same disk speed even though playback may be initiated from a different zone.

Figure 6:
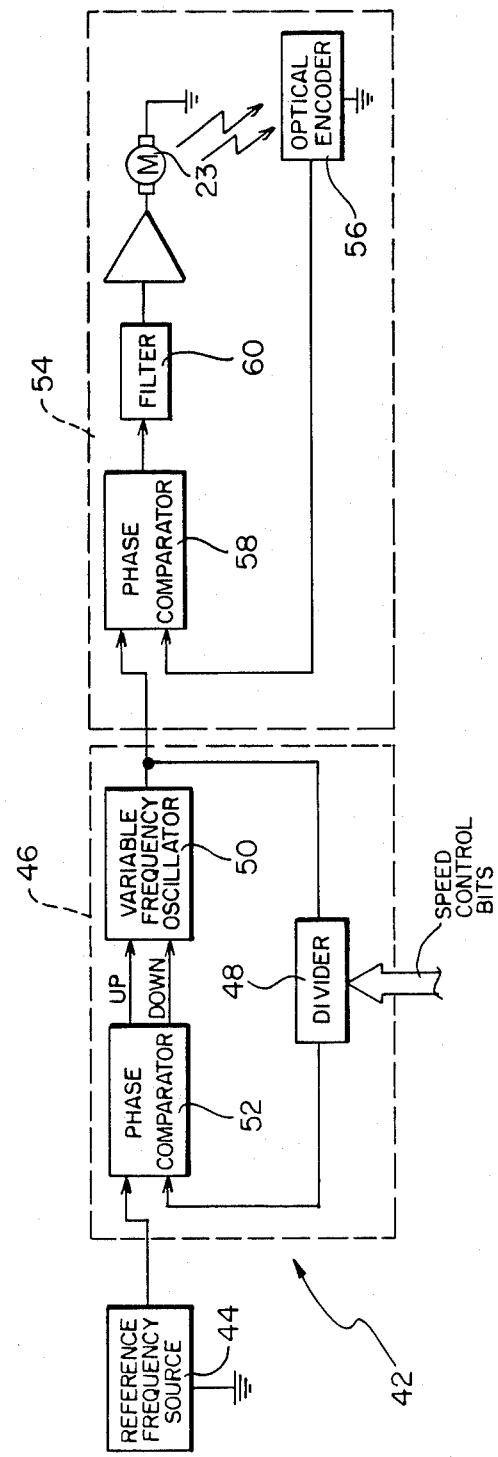
FIG. 6 is a more detailed block diagram of electronic circuitry for causing the disk to rotate at a desired speed.

FIG. 6 shows a preferred embodiment of the rotational controller 42 in greater detail. A reference frequency source 44, preferably in the form of a crystal oscillator, provides a reference signal having a predetermined frequency. A phase lock loop 46, responsive to the output of the source 44, functions to provide an AC output signal having an adjustable frequency corresponding to a desired speed for the drive motor 23. For that purpose, the phase lock loop 46 includes a divider 48 in a feedback path coupling the output of a VFO 50 to an input of a phase comparator 52.

The divider 48 serves to produce an output signal that is synchronized with the output of the frequency source 44. To that end, the divider 48 receives the aforementioned speed control bits from the track number decoder 40 and produces an output, the frequency of which is equal to the frequency of the output signal of the VFO 50 divided by the number represented by the speed control bits received. Thus, if the frequency of the VFO output is either too high or too low, the output frequency of the divider 48 is correspondingly too high or too low relative to the output of the source 44. The phase comparator 52, in turn, serves to adjust the output frequency of the VFO 50, either up or down, in accordance with the output of the divider 48.

A phase lock loop 54, responsive to the output of the VFO 50, serves to drive the motor 23 at a desired speed. To that end, an optical encoder 56 produces an output related to the rotational speed of the motor 23. A phase comparator 58 serves to provide an output corresponding to a synchronization error between the output of the VFO 50 and the output of the encoder 56. A lowpass filter 60 provides a drive voltage for the motor 23. To that end, the filter 60, by means of a relatively low upper-cutoff frequency, functions to smooth the output of the phase comparator 58, to produce a relatively stable voltage to drive the motor 23 at the desired speed.

Thus, if it were needed to change the speed of the motor 23, for example due to the accessing of a different one of the zones 22, the divider 48, under the influence of the speed control bits from the track number decoder 40, would adjust the frequency of its output signal in accordance with a change in speed-control-bit pattern. This, in turn, would cause the phase comparator 52 to adjust the frequency of the VFO 50. The phase comparator 58, under the influence of the VFO 50, would adjust its output as the output from the encoder 56 would now be out of sync with the VFO. Thus, the speed of the motor 23 would change until the output of the encoder 56 was again synchronized with the VFO 50.

ADVANTAGEOUS TECHNICAL EFFECT

From the foregoing, it is apparent that an improved data-recording format has been disclosed for an information-bearing disk of the type having data-storing tracks grouped into a plurality of annular zones encircling the center of the disk, with each track in a given zone having the same number of information-bearing bits as other tracks in the same zone. Unlike the prior art "zoned" disks having a recording format of this type, the zones, in accordance with the invention, are of progressively varying width, with a ratio, k, between the radius of the innermost track of any given zone to the radius of the innermost track of the adjacent zone being a constant which is the same for each pair of adjacent zones. By arranging the zones in a manner, with the innermost track of each zone having the same bit density (presumably the maximum permitted by the recording system), upon accessing forward (or backward) each successive zone when disk angular velocity is constant, the same percentage change in data rate is caused to occur when stepping in a given direction from one zone to the next zone. A particular advantage of this feature is that the number of permutations of read data dates is significantly reduced when disk angular velocity is held constant for a given read operation. With a disk having N zones, the number of unique read data rates is reduced to $2N-1$ from $N^2-(N-1)$, for a zoned disk of the type known in the prior art. Accordingly, the invention enables a corresponding reduction in the number of high performance data decoder channels needed to accommodate the variations in read data rate when disk angular velocity is constant.

A further advantage of the recording format of the present invention is that the range of linear track velocities is a constant from one zone to the next. This quasi-constant linear velocity (QCLV) effect simplifies a data recording operation as the data write circuitry may operate over a range of power levels that is a constant from zone to zone.

The invention has been described in detail with reference to the figures, however, it will be appreciated that variations and modifications are possible within the spirit and scope of the invention.

What is claimed is:

1. In a disk adapted for recording and playing back data from addressable data-storing tracks grouped into a plurality, greater than two, of annular zones encircling the center of said disk, the improvement wherein:

the ratio of the radius of the innermost track of any given zone to the radius of the innermost track of the adjacent inner zone is a constant, k, calculated from:

$$k = \sqrt[N]{\frac{R_0}{R_i}}$$

where $R_o$ is the outer radius of the outermost zone of said disk, $R_1$ is the inner radius of the innermost zone of said disk, and N is the number of zones.

2. In a disk adapted for recording and playing back data from addressable data-storing tracks grouped into a plurality, greater than two, of N annular zones encircling the center of said disk, the improvement wherein:

the ratio of the radius of the innermost track of any given zone to the radius of the innermost track of the adjacent inner zone is a constant, k, which is substantially the same for each corresponding pair of adjacent zones, k being calculated from:

$$k = \sqrt[N]{\frac{R_0}{R_i}}$$

where $R_o$ is the outer radius of the outermost zone of said disk, and $R_1$ is the inner radius of the innermost zone of said disk.

* * * * *